Patented July 4, 1933

1,916,206

UNITED STATES PATENT OFFICE

THOMAS C. DAWSON, OF BETHLEHEM, PENNSYLVANIA, ASSIGNOR TO BETHLEHEM STEEL COMPANY, A CORPORATION OF PENNSYLVANIA

WELDING ELECTRODE AND METHOD OF PRODUCING SAME

No Drawing.   Application filed May 8, 1929.   Serial No. 361,536.

My invention relates to metallic welding electrodes. The primary purpose of this invention is to secure a welding electrode which will be quiet and even in operation and which will necessitate the employment of a relatively short arc; which will give good penetration and a joint that will be sound and homogeneous and be as free as possible from gas inclusions.

The essential feature of this invention is a metallic electrode containing a small amount of barium impregnated in at least a portion of the electrode metal.

One way in which my invention may be embodied is as follows: A low carbon iron, for example one containing carbon about .12 and manganese about .40 is drawn through dies to form electrode wire. During the drawing operation a lubricant is used containing barium carbonate. The lubricant may consist entirely of barium carbonate without any other admixture. As a result of this drawing operation an electrode wire is obtained whose surface is impregnated with small amounts of barium carbonate.

It is to be understood that the barium carbonate is more or less taken up by the superficial portions of the metal during the working of the metal incidental to the drawing. While a certain amount of the barium carbonate may merely be on the surface of the metal at least a portion of this compound is impregnated in the surface metal itself.

Electrodes made of wire thus prepared have shown some remarkable properties. It is found that when used in arc welding the deposition of the metal is very regular and quiet, there being very little or no sputtering or unevenness of operation which is so common with much arc welding. Even more important is the fact that with these electrodes a short arc must be employed; if the operator attempts to employ a long arc very inferior results are obtained which are so marked that the fact of a long arc having been employed is at once obvious. As a consequence the operator is compelled to employ a short arc. Naturally this means that the welding is accomplished under the most favorable circumstances. The heating is localized, the penetration is greater, the deposited metal and the welded joint are much sounder and more homogeneous and there are very few if any gas inclusions.

These electrodes are especially valuable in vertical welds and for overhead welding. In overhead welding with ordinary electrodes there is a decided tendency for the electrodes to melt and drop downwardly. With my electrodes this effect is largely obviated.

Tests made upon welds effected with such electrodes show that the tensile strength is appreciably greater than that usually obtained; there are practically no trapped gases at the base of the weld; the deposited metal is clean and homogeneous throughout and there are few or no hard spots or irregularities such as are ordinarily found in welds produced by the usual arc welding. Naturally as a result of the short arc there is but little danger of burnt metal.

While I have mentioned the barium as being impregnated in the surface of the metal by using it in the form of a carbonate and as a lubricant during the drawing of the wire it is obvious that this constituent of the electrode may be introduced in other ways. For example, obviously the entire mass of the electrode metal may be impregnated with barium, either as a compound or in the elemental stage by adding it to the melt in which the metal is prepared from which to draw the electrode wire. As is evident, various compounds other than the carbonate may be used or even the elemental metal itself. The essential thing is that the electrode be prepared with a certain amount of barium incorporated in at least a portion of the metal base of the electrode.

While the specific example given above refers to iron of a low carbon content it is obvious that the idea may be applied with irons or steels containing a different carbon content or even with non-ferrous materials.

Having described my invention what I desire to claim is as follows:

1. A ferrous metal welding electrode the metal of which is impregnated with barium.

2. A metal welding electrode the metal of which is impregnated with a small amount of barium.

3. A metal welding electrode the metal of which is impregnated with a small amount of a barium compound.

4. A ferrous metal welding electrode the metal of which is impregnated with a small amount of a barium compound.

5. A ferrous metal welding electrode the metal of which is impregnated with a small amount of barium carbonate.

6. A process for preparing a welding electrode comprising the step of drawing ferrous uncoated metal through dies in the presence of a lubricant containing barium.

7. A process for preparing a welding electrode comprising the step of drawing uncoated metal through a die in the presence of a lubricant containing barium.

8. A process for preparing a welding electrode comprising the step of drawing uncoated metal through a die in the presence of a lubricant containing a compound of barium.

9. A process for preparing a welding electrode comprising the step of drawing uncoated metal through a die in the presence of a lubricant of barium carbonate.

10. A process for preparing a welding electrode comprising the step of drawing ferrous uncoated metal through a die in the presence of a lubricant consisting of barium carbonate.

11. A ferrous metal, welding electrode in the surface of which metal is impregnated barium.

12. A ferrous metal, welding electrode the surface of which metal is impregnated with a small amount of barium carbonate.

13. A metal welding electrode the surface of which metal is impregnated with a small amount of barium.

In testimony whereof I hereunto affix my signature.

THOMAS C. DAWSON.